United States Patent [19]

Bourgeois

[11] Patent Number: 5,308,455

[45] Date of Patent: May 3, 1994

[54] PROCESS FOR THE MANUFACTURE OF SODIUM HYDROXIDE

[75] Inventor: Louis Bourgeois, Brussels, Belgium

[73] Assignee: Solvay (Société Anonyme), Brussels, Belgium

[21] Appl. No.: 28,540

[22] Filed: Mar. 8, 1993

[30] Foreign Application Priority Data

Mar. 9, 1992 [BE]  Belgium .............................. 09200235

[51] Int. Cl.⁵ .............................................. B01D 61/44
[52] U.S. Cl. ................................... 204/98; 204/182.4; 204/301
[58] Field of Search ..................... 204/98, 182.4, 182.5, 204/301

[56] References Cited

U.S. PATENT DOCUMENTS

| | | | | |
|---|---|---|---|---|
| 4,049,519 | 9/1977 | Sloan | ............................ | 204/182.4 |
| 4,238,305 | 12/1980 | Gancy | ............................ | 204/182.4 |
| 4,584,077 | 4/1986 | Chlanda et al. | ............................ | 204/182.4 |

FOREIGN PATENT DOCUMENTS

| | | |
|---|---|---|
| 8901059 | 2/1989 | PCT Int'l Appl. . |
| 1402920 | 8/1975 | United Kingdom . |
| 1497748 | 1/1978 | United Kingdom . |
| 1497749 | 1/1978 | United Kingdom . |
| 1518387 | 7/1978 | United Kingdom . |
| 1522877 | 8/1978 | United Kingdom . |
| 2122543 | 1/1984 | United Kingdom . |

*Primary Examiner*—John Niebling
*Assistant Examiner*—Arun S. Phasge
*Attorney, Agent, or Firm*—Spencer, Frank & Schneider

[57] ABSTRACT

Process for the manufacture of sodium hydroxide, according to which an electrodialysis cell is used, water or an aqueous sodium hydroxide solution (10, 10') is introduced into a chamber (6, 6') of the cell, defined between a cationic membrane (2, 2') and an anionic face (8, 8') of a bipolar membrane (3, 3'), an aqueous sodium carbonate solution (11, 11') is introduced into a chamber (7, 7') defined between a cationic face (9, 9') of the bipolar membrane (3, 3') and another cationic membrane (2', 2''), an alkaline pH is maintained in the chamber (7, 7') which is supplied with the sodium carbonate solution (11, 11') and an aqueous sodium hydroxide solution (12, 12') is drawn off from the chamber (6, 6') containing the anionic face (8, 8') of the bipolar membrane (3, 3').

5 Claims, 1 Drawing Sheet

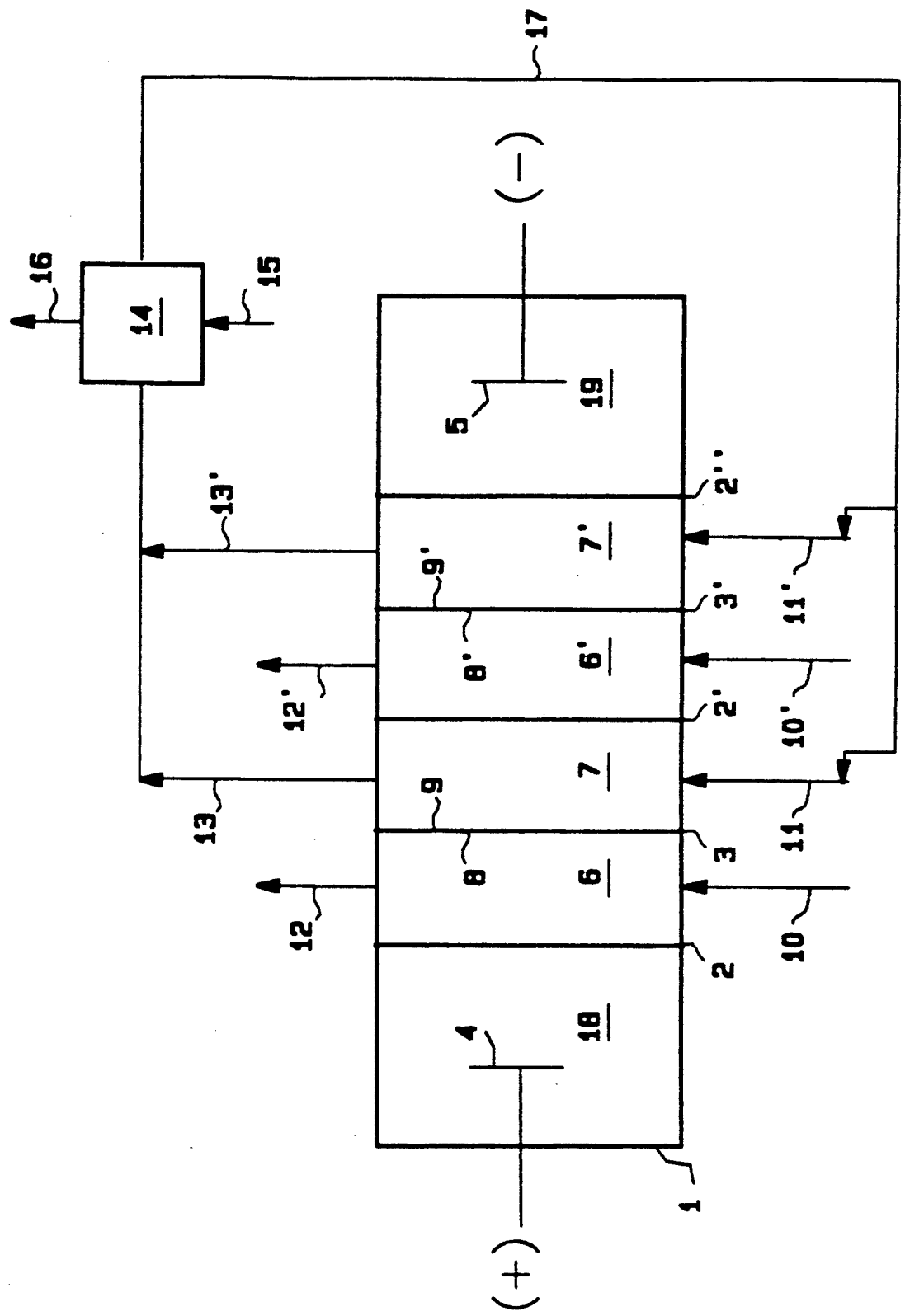

5,308,455

PROCESS FOR THE MANUFACTURE OF SODIUM HYDROXIDE

FIELD OF THE INVENTION

The invention relates to the manufacture of sodium hydroxide.

It relates more particularly to a process for the manufacture of sodium hydroxide by electrodialysis.

TECHNOLOGY REVIEW

Electrodialysis is a well known technique for producing aqueous sodium hydroxide solutions. Thus, in the U.S. Pat. No. 4,238,305, a process is described in which an electrodialysis cell comprising alternating cationic membranes and bipolar membranes is used, water or a dilute aqueous sodium hydroxide solution is introduced into the chambers defined between a cationic membrane and the anionic face of a bipolar membrane and an aqueous sodium carbonate solution is introduced into the chambers defined between a cationic membrane and the cationic face of a bipolar membrane. In this known process, an alkaline pH is maintained in the chambers which are supplied with water or the sodium hydroxide solution and an acidic pH is maintained in the chambers which are supplied with the sodium carbonate solution. In this way, carbon dioxide is generated in the acidic chambers. In this known process, the generation of carbon dioxide in the electrodialysis cell involves disadvantages. In effect, the bipolar membranes used in these known processes are formed by joining an anionic membrane and a cationic membrane side by side, in such a way that if carbon dioxide is formed in the pores of the cationic face of the bipolar membrane, the two membranes which constitute it risk becoming separated from each other. Moreover, the gas thus produced subjects the membranes to mechanical stresses which are capable of damaging them and additionally significantly increases the electrical resistance of the electrolyte and consequently the consumption of electricity.

SUMMARY OF THE INVENTION

The process according to the invention remedies these disadvantages of the known process described above by providing an improved process which makes it possible to produce an aqueous sodium hydroxide solution in an electrodialysis cell which is not the site of gas formation.

The invention consequently relates to a process for the manufacture of sodium hydroxide, according to which an electrodialysis cell is used, water or an aqueous sodium hydroxide solution is introduced into a chamber of the cell, defined between a cationic membrane and an anionic face of a bipolar membrane, an aqueous sodium carbonate solution is introduced into a chamber of the cell, defined between a cationic face of the bipolar membrane and another cationic membrane, and an aqueous sodium hydroxide solution is drawn off from the chamber containing the anionic face of the bipolar membrane; according to the invention, an alkaline pH is maintained in the chamber which is supplied with the sodium carbonate solution.

BRIEF DESCRIPTION OF THE DRAWING

The drawing is a schematic illustration of the process of the present invention for the manufacture of sodium hydroxide.

DETAILED DESCRIPTION OF THE INVENTION

In the process according to the invention, cationic membrane is understood to designate a thin, nonporous sheet which is selectively permeable to cations and impermeable to anions. The cationic membranes which can be used in the process according to the invention must be made of a material which is inert with respect to aqueous sodium hydroxide solutions. Cationic membranes which can be used in the process according to the invention are, for example, sheets made of fluorinated polymer containing cationic functional groups derived from sulphonic acids, carboxylic acids or phosphonic acids or mixtures of such functional groups. Examples of membranes of this type are those described in the Patents GB-A-1,497,748 and GB-A-1,497,749 (Asahi Kasei Kogyo K. K.), GB-A-1,518,387 and GB-A-1,522,877 (Asahi Glass Company Ltd) and GB-A-1,402,920 (Diamond Shamrock Corp.). Membranes which are particularly suited to this application of the cell according to the invention are those known under the names "Nafion" (Du Pont) and "Flemion" (Asahi Glass Company Ltd).

Bipolar membranes are membranes which exhibit, on one face, the properties of a cationic membrane and, on the other face, the properties of an anionic membrane, an anionic membrane being, by definition, a thin, nonporous sheet which is selectively permeable to anions and impermeable to cations. The bipolar membranes can generally be obtained by joining a cationic membrane and an anionic membrane side by side by exploiting, for example, to this end, the techniques described in British Patent Application GB-A-2,122,543 and in International Patent Application WO 89/1059 (both on behalf of Unisearch Ltd). Anionic membranes which can be used to make bipolar membranes which can be used in the process according to the invention are sheets made of a polymeric material which is inert with respect to aqueous sodium hydroxide solutions and which comprises quaternary ammonium groups acting as permanent anionic sites.

In practice, the cationic membranes are not absolutely impermeable to anions and the anionic membranes are not absolutely impermeable to cations. By definition, the current efficiency of a cationic membrane is the molar fraction of the cation which effectively passes through the membrane under the action of one faraday. Similarly, the current efficiency of an anionic membrane is the molar fraction of the anion which effectively passes through the membrane under the action of one faraday.

The electrodialysis cell comprises at least one bipolar membrane and two cationic membranes between an anode and a cathode connected respectively to the positive terminal and to the negative terminal of a source of direct current. The anode is situated on the side comprising the anionic face of the bipolar membrane and the cathode is situated on the side comprising the cationic face of the bipolar membrane.

An aqueous sodium carbonate solution is introduced into the chamber comprising the cationic face of the bipolar membrane. The aqueous sodium carbonate solution can be a dilute solution or a concentrated solution. Concentrated solutions are preferably used, in which the concentration must however be compatible with the solubility of sodium bicarbonate in water, so as to avoid precipitation of sodium bicarbonate in the cell.

Water or a dilute aqueous sodium hydroxide solution is introduced into the chamber comprising the anionic face of the bipolar membrane. Dilute aqueous sodium hydroxide solution is understood to designate an unsaturated solution. The concentration of sodium hydroxide in the aqueous solution is conditioned by the necessity of avoiding damage to the membranes by the sodium hydroxide. To this end, it is recommended that a concentration of sodium hydroxide be selected which is less than 10 mol/l, preferably less than 5 mol/l, the concentrations not exceeding 2.5 mol/l being especially recommended. In practice, good results are obtained by selecting aqueous solutions in which the concentration of sodium hydroxide is greater than 0.2 mol/l, preferably at least equal to 0.5 mol/l, the preferred concentrations lying between 1 and 2 mol/l.

Under the action of the electrical electrodialysis current, there is dissociation of water in the bipolar membrane, diffusion of $Na^+$ cations through the cationic membranes, formation of sodium hydroxide in the chamber comprising the anionic face of the bipolar membrane and conversion of at least part of the sodium carbonate to sodium bicarbonate in the other chamber.

According to the invention, a pH is maintained in the chamber comprising the cationic face of the bipolar membrane which is sufficiently alkaline to prevent decomposition of the sodium bicarbonate. Generally, the minimum pH value to be achieved depends on the concentration of the aqueous sodium carbonate solution used. In practice, it is desirable to maintain a pH greater than 8, preferably at least equal to 8.2. The desired pH value is generally achieved by a suitable adjustment of the respective contents of sodium carbonate and sodium bicarbonate in the aqueous solution present in the cell, these contents themselves depending on the flow rate of the solution in the cell. In practice, the pH is maintained below 10 and generally does not exceed 9. The values from approximately 8.2 to approximately 9 are especially recommended.

In the process according to the invention, an aqueous sodium hydroxide solution is drown off from the chamber comprising the anionic face of the bipolar membrane and an aqueous sodium bicarbonate solution (possibly containing sodium carbonate) is drown off from the chamber comprising the cationic face of the bipolar membrane. These solutions can be value-enhanced separately. In particular, the sodium bicarbonate solution can be cooled in order to crystallise sodium bicarbonate, or can be conveyed as it is to a factory where the ammonia-soda process is operated.

In a particular embodiment of the process according to the invention, the sodium bicarbonate collected from the cell is decomposed to produce sodium carbonate which is recycled to the chamber containing the cationic face of the bipolar membrane. In this embodiment of the process, the means used to decompose the sodium bicarbonate is not critical. For example, the aqueous sodium bicarbonate solution extracted from the cell can be treated with alkali metal or alkaline-earth metal oxide or hydroxide. Preferably, milk of lime is used.

Distinctive features and details of the invention will emerge from the following description of the appended drawing, which schematically represents an electrodialysis cell for the implementation of the process according to the invention.

The cell represented in the figure comprises, in an enclosure 1, three cationic membranes 2, 2', 2'' and two bipolar membranes 3, 3' alternating between an anode 4 and a cathode 5. The membranes 2, 3, 2', 3' and 2'' define between them four electrodialysis chambers 6, 7, 6', 7'. The membranes 2, 2' and 2'' are cationic membranes and the membranes 3 and 3' are bipolar membranes. The arrangement of the bipolar membrane 3 in the cell is such that its anionic face 8 is situated in the chamber 6 and its cationic face 9 in the chamber 7. Similarly, the bipolar membrane 3' has its anionic face 8' in the chamber 6' and its cationic face 9' in the chamber 7'.

In practice, industrial electrodialysis cells comprise a large number (generally several tens) of chambers such as 6 (and 6') and 7 (and 7').

During the operation of the electrodialysis cell, water or a dilute aqueous sodium hydroxide solution 10 (10') is introduced into the chamber 6 (6'), an aqueous sodium carbonate solution 11 (11') is introduced into the chamber 7 (7') and the electrodes 4 and 5 are connected to the terminals of a source of direct current. An aqueous electrolyte, the composition of which is not critical, is circulated in the end chambers 18 and 19 containing the electrodes 4 and 5. Under the effect of the voltage difference between the electrodes 4 and 5, there is dissociation of water on the bipolar membranes 3 and 3', giving rise to the formation of protons in the chambers 7 and 7' and to the formation of hydroxyl ions in the chambers 6 and 6'. Simultaneously, sodium cations migrate from the chamber 7 into the chamber 6', passing through the cationic membrane 2'. In this way, there is formation of sodium hydroxide in the chambers 6 and 6' and of sodium bicarbonate in the chambers 7 and 7', to the detriment of the sodium carbonate.

According to the invention, the flow rates of the solutions are adjusted so as to maintain a pH in the region of 8.5 in the chamber 7, to avoid decomposition of the sodium bicarbonate which forms therein.

There is recovered, from the chambers 6 and 6', an aqueous sodium hydroxide solution 12 (respectively 12') and, from the chambers 7 and 7', an aqueous sodium carbonate and sodium bicarbonate solution 13 (respectively 13'). The aqueous solution 13, 13' is conveyed to a reaction chamber 14 into which a milk of lime 15 is moreover introduced in a sufficient quantity to decompose the sodium bicarbonate. Calcium carbonate 16 and an aqueous sodium carbonate solution 17, which is recycled to the chambers 7, 7', are drawn off from the reaction chamber 14.

The following example serves to illustrate the invention.

An electrodialysis cell such as represented in the figure, in which each membrane has a surface area of 1 m$^2$, is used and a current of 1 kA is circulated therein.

Water is introduced into the chamber 6, at an hourly flow rate of 12.87 l, and an aqueous sodium carbonate solution (containing 156 g of sodium carbonate per l) is introduced into the chamber 7 at an hourly flow rate of 23.3 l.

The efficiency of the bipolar membrane 3 being assumed equal to 0.95 and that of the cationic membrane 2 to 0.97, the hourly production of the cell is 12.3 l of a 10% by weight aqueous sodium hydroxide solution and 23.3 kg of a saturated aqueous sodium bicarbonate solution (containing 0.124 kg of sodium bicarbonate per kg).

I claim:

1. A process for the manufacture of sodium hydroxide, comprising:
   providing an electrodialysis cell comprising parallel, spaced alternating cationic and bipolar membranes defining chambers therebetween, said bipolar membranes having opposite cationic and anionic faces;

introducing aqueous sodium carbonate solution into first chambers of said electrodialysis cell defined by a cationic face of said bipolar membrane, and a cationic membrane, and maintaining the pH of said sodium carbonate solution in said first chambers sufficiently alkaline to avoid decomposition of sodium bicarbonate;

introducing water or an aqueous sodium hydroxide solution into second chambers of said electrodialysis cell defined by an anionic face of said bipolar membrane and a cationic membrane;

withdrawing aqueous sodium bicarbonate solution from said first chambers and decomposing said aqueous sodium bicarbonate solution to form an aqueous sodium carbonate solution and recycling said aqueous sodium carbonate solution into said first chambers; and withdrawing aqueous sodium hydroxide from said second chambers of said electrodialysis cell.

2. The process according to claim 1, wherein the pH in said first chambers is greater than about 8.

3. The process according to claim 2, wherein the pH in first chambers if between about 8.2 and 9.

4. The process according to claim 1, wherein said withdrawn sodium bicarbonate solution is treated with an alkali metal or alkaline-earth metal oxide or hydroxide to decompose said sodium bicarbonate.

5. The process according to claim 4, wherein said sodium bicarbonate solution is decomposed with calcium hydroxide.

* * * * *